United States Patent
Li

(10) Patent No.: US 7,331,571 B2
(45) Date of Patent: Feb. 19, 2008

(54) INTEGRATED SOLENOID VALVE AND AIR SPRING ASSEMBLY

(75) Inventor: Yunjun Li, West Bloomfield, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 111 days.

(21) Appl. No.: 11/219,899

(22) Filed: Sep. 6, 2005

(65) Prior Publication Data

US 2007/0052141 A1    Mar. 8, 2007

(51) Int. Cl.
*F16F 9/342* (2006.01)
(52) U.S. Cl. .................................. 267/64.18
(58) Field of Classification Search .. 267/64.16–64.28, 267/122, 256
See application file for complete search history.

(56) References Cited

U.S. PATENT DOCUMENTS

| | | | |
|---|---|---|---|
| 2,901,241 A * | 8/1959 | Lautzenhiser et al. ...... | 267/186 |
| 4,829,436 A | 5/1989 | Kowalik et al. ....... | 364/424.05 |
| 5,465,209 A | 11/1995 | Sammut et al. ........ | 364/424.05 |
| 5,931,451 A * | 8/1999 | Onami ..................... | 267/64.24 |
| 6,247,306 B1 * | 6/2001 | Sonnak ....................... | 267/122 |
| 6,698,778 B2 | 3/2004 | Roemer et al. ....... | 280/124.157 |
| 6,824,143 B2 * | 11/2004 | Choi ....................... | 280/5.514 |
| 6,923,433 B2 * | 8/2005 | Gross et al. ............. | 267/64.11 |

FOREIGN PATENT DOCUMENTS

| EP | 474171 A1 * | 3/1992 |
|---|---|---|
| JP | 2003294072 A * | 10/2003 |

OTHER PUBLICATIONS

"Solenoid Valve Selection: Don't Be Fooled by Flow Rate" by C. Bald and R. Condon, Parker Hannifin Corp., webpage: www.parker.com, 6 pages. Dated Sep. 11, 2003.

* cited by examiner

*Primary Examiner*—Xuan Lan Nguyen

(57) ABSTRACT

A portion of the housing of an air operated leveling device is configured to integrally include an air valve receptacle which receives thereinside a solenoid valve. The housing carries an air fitting and an electrical connector which are interconnected with the solenoid valve receptacle, and, in turn, the solenoid valve. The solenoid valve communicates with the air fitting and the interior of the housing to regulate pressure inside the housing in response to electrical signals sent to the electrical connector.

9 Claims, 6 Drawing Sheets

INTEGRATED SOLENOID VALVE AND AIR SPRING ASSEMBLY

TECHNICAL FIELD

The present invention relates generally to motor vehicle air suspension systems, and more particularly to the compressed air leveling devices thereof. Still more particularly, the present invention relates to an integrated solenoid valve and air leveling device for a motor vehicle air suspension system.

BACKGROUND OF THE INVENTION

Motor vehicle air suspension systems utilize compressed air operated leveling devices, as for example air springs and/or air controlled shock absorbers or a combination thereof, to provide ride and leveling control of the vehicle. Such air suspension systems utilize an air compressor to provide a source of compressed air to the air operated leveling devices. In a typical configuration, as for example described in any of U.S. Pat. Nos. 4,829,436, 5,465,209 and 6,698,778, the air compressor is selectively connected, by electronically controlled solenoid valves, to the air operated leveling devices, a compressed air reservoir, an air intake, and an air exhaust. Most air suspension systems operate in an "open state" in the sense the excess pressure within the system is vented to the atmosphere at the exhaust and the source air for the compressor is drawn from the atmosphere at the intake; however, at least one air suspension system (see above-cited U.S. Pat. No. 6,698,778) operates in a "closed state" in the sense that air is not exchanged with the atmosphere, wherein excess pressure is stored in an air reservoir and the source air for the compressor is either the air reservoir or the air springs.

Turning attention now to FIG. 1, an example of a prior art motor vehicle suspension system 10 is depicted, as generally also shown and described in aforementioned U.S. Pat. No. 4,829,436 to Kowalik et al, issued on May 9, 1989 and assigned to the assignee hereof, the disclosure of which is hereby incorporated herein by reference.

The motor vehicle air suspension system 10 includes four compressed air operated leveling devices 12 which may be air springs and/or air operated shock absorbers, or a combination thereof, a computer 14, a compressor/exhaust apparatus 16, an air drier 18, a pressure switch 20, a valve assembly 22, a plurality of air lines 24 and signal lines 26. The plurality of air lines 24 go to the four leveling devices 12 to provide pressurized air from the valve assembly 22. A road wheel 28 is associated with each leveling device 22. The computer 14 receives an ignition signal, vehicle speed signal and vehicle door disposition signal. The computer 14 controls the operation of each solenoid valve in the valve assembly 22. The computer 14 also receives input from sensors in three of the four road wheels 28 through the three signal lines 26. The compressor/exhaust apparatus 16 selectively sources or vents air through the air drier 18. A master air line 30 runs from the pressure switch 20 to the valve assembly 22 which controls compressed air communication between the compressor/exhaust apparatus 16 and the individual leveling devices 12 in response to signals from the computer 14. The pressure switch 20 also provides a signal to the computer 14 when the air pressure to any leveling device falls below 35 psi so that incremented pressure is automatically provided to that leveling device.

Problematically, the solenoid valves are external to the leveling devices. What remains needed in the art is an improved motor vehicle air suspension system wherein the solenoid valves are integrated into the leveling devices, whereby provided would be lower cost, weight, package size, and component complexity, as well as improved environmental protection and retained integrity of air compression even if the air line is untowardly damaged.

SUMMARY OF THE INVENTION

The present invention is an integrated solenoid valve and air operated leveling device, as for example an air spring, air spring over damper module, air spring over strut module, or air jounce bumper.

According to the present invention, a portion of the housing of an air operated leveling device is configured to include an air valve receptacle for receiving thereinside a solenoid valve, wherein the integrated solenoid valve is connected by an air line to, for example, an air suspension system of the motor vehicle.

In the preferred embodiment of the integrated solenoid valve and leveling device according to the present invention, the housing of an air spring includes an integral solenoid valve receptacle internally disposed with respect to the air spring housing. The solenoid valve receptacle is composed of a solenoid valve chamber and a chamber cover, which is selectively connectable to the solenoid valve chamber, as for example by a snap fit or by threading. Either the piston or the cap portion of the housing of the air spring integrally includes the solenoid valve chamber. An air line fitting is externally disposed in the housing, wherein the air line fitting communicates with the solenoid valve chamber. The chamber cover includes an air passage opening which communicates with the solenoid valve chamber when the chamber cover is attached to the solenoid valve chamber. An electrical connector is disposed externally with respect to the housing adjacent the solenoid valve chamber, whereby an electrical connection can be made therefrom into the solenoid valve chamber.

In assembly of the preferred embodiment of the integrated solenoid valve and leveling device according to the present invention, the air spring is opened, as for example the bellows thereof is unclamped at one end, and the chamber cover removed from the solenoid valve chamber. A solenoid valve is placed into the solenoid valve chamber, wherein one air passage thereof interfaces with the air line fitting. Electrical connection is made between the electrical connector and the solenoid valve. The chamber cover is reattached to the solenoid valve chamber, as for example by snapping thereon, wherein the other air passage of the air valve projects, in sealing relation to the solenoid valve chamber, through the air passage opening of the chamber cover. The bellows is again closed. An electrical plug of an air suspension system is interfaced with the electrical connector. An air line is connected to the air line fitting.

In operation of the preferred embodiment of the integrated solenoid valve and leveling device according to the present invention, in response to electrical signals from the air suspension system, the solenoid valve regulates the air pressure within the air spring and the motor vehicle is provided with an air suspension via flexing of the bellows. Should an untoward event occur to the air line, such as for example a cut or break wherein pressure is lost, the air valve will nonetheless independently maintain pressure within the air spring.

Accordingly, it is an object of the present invention to provide an integrated solenoid valve and air operated leveling device, as for example an air spring, air spring over damper module, air spring over strut module, or air jounce bumper.

DESCRIPTION OF THE PREFERRED EMBODIMENT

Figure 1:
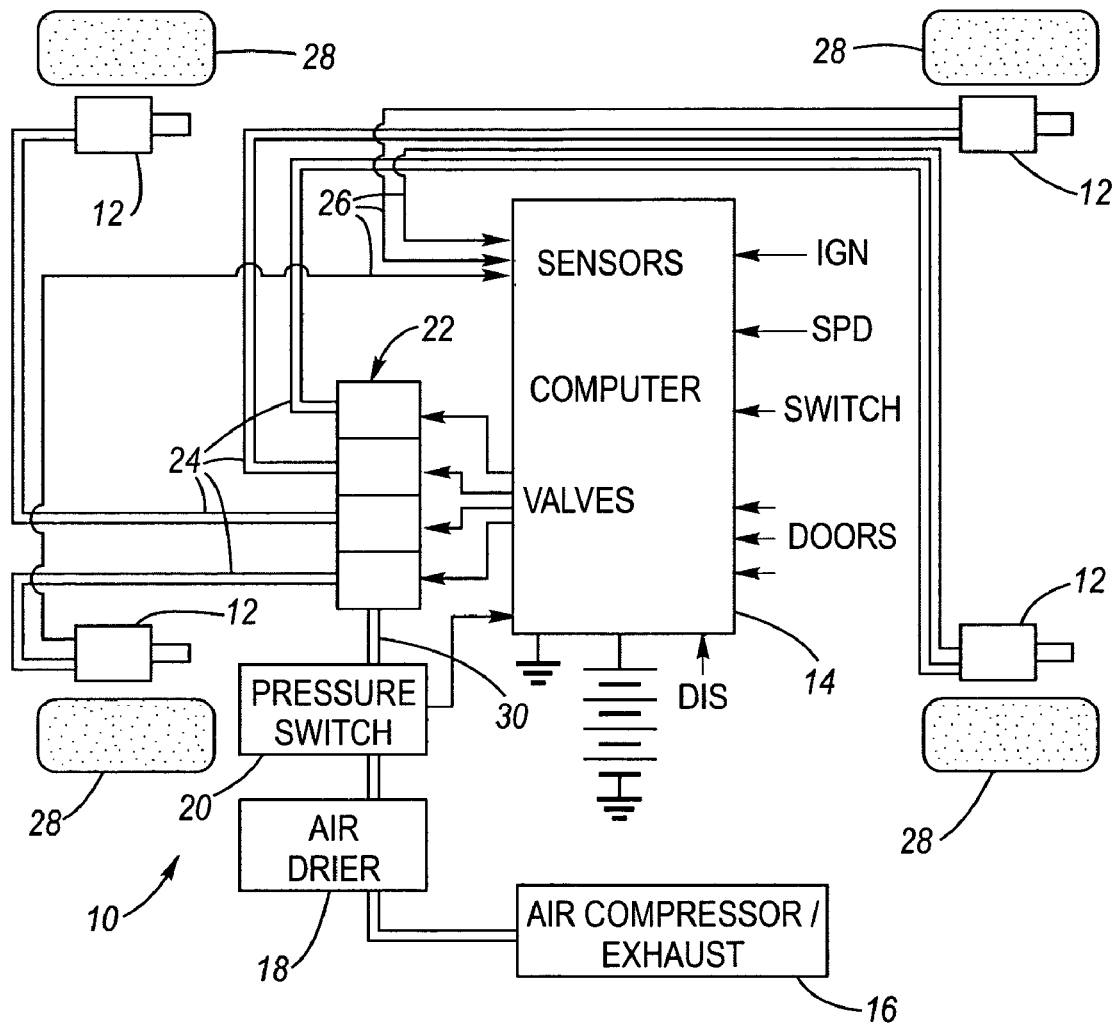
FIG. 1 is a schematic diagram of a prior art motor vehicle air suspension system.

Referring now to FIGS. 2 through 7, various aspects of an integrated solenoid valve and leveling device 100 according to the present invention are shown, wherein, merely by exemplification, the motor vehicle air suspension system 10 of FIG. 1 may be interfaced therewith.

Figure 2:
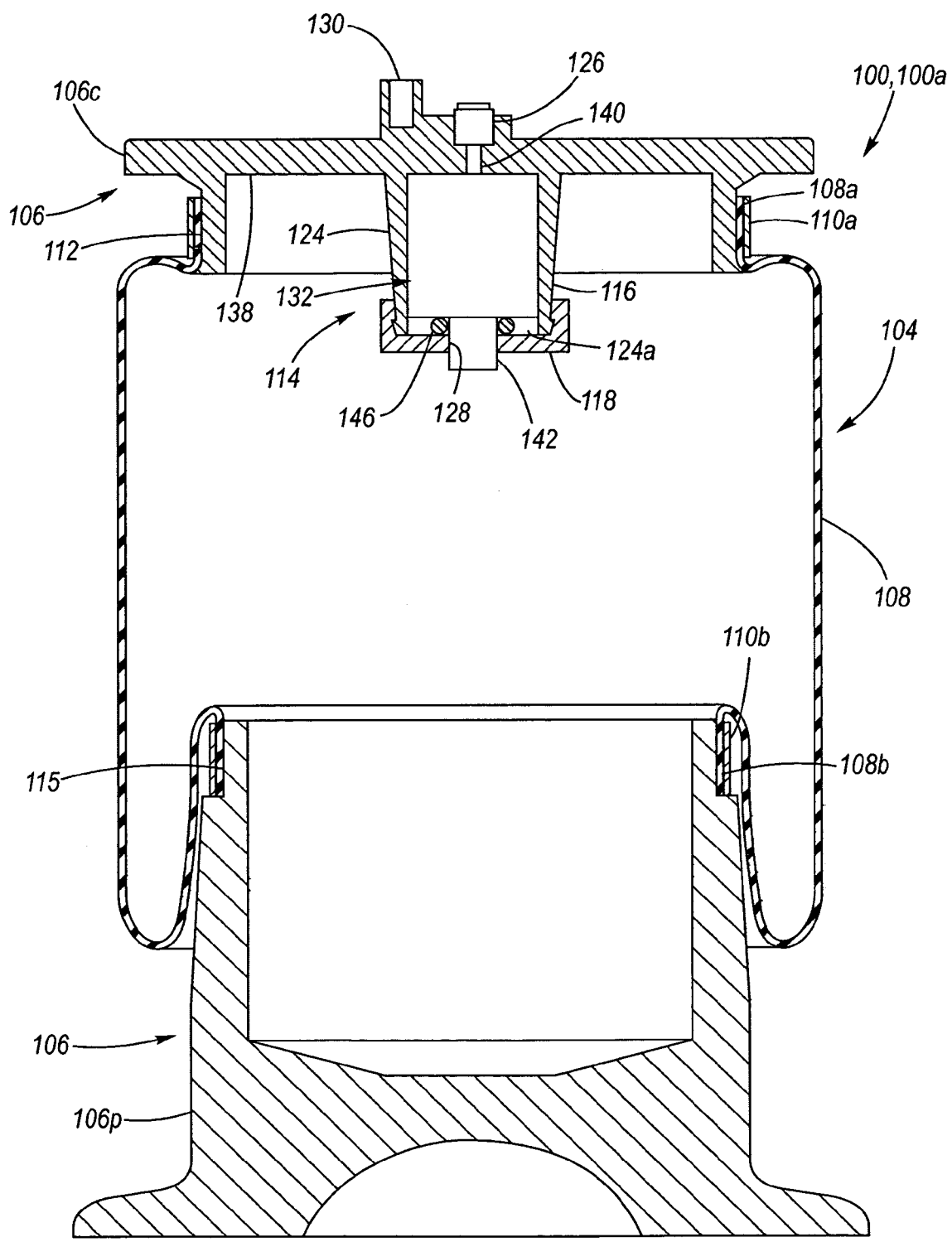
FIG. 2 is a sectional view of an air spring with integrated solenoid valve according to a first embodiment of the present invention.
Figure 3:
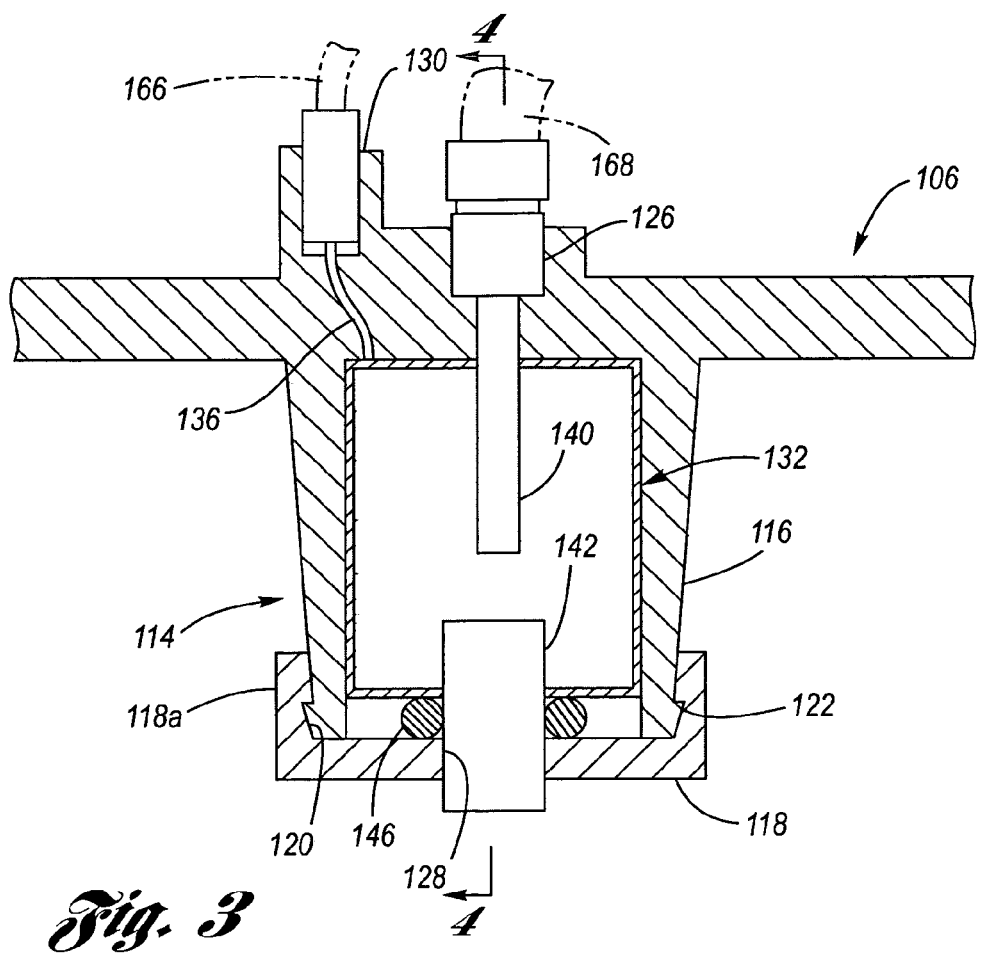
FIG. 3 is a detail sectional view of a portion of FIG. 2, showing in particular the solenoid valve and solenoid valve receptacle integrated with the housing of the air spring.
Figure 4:
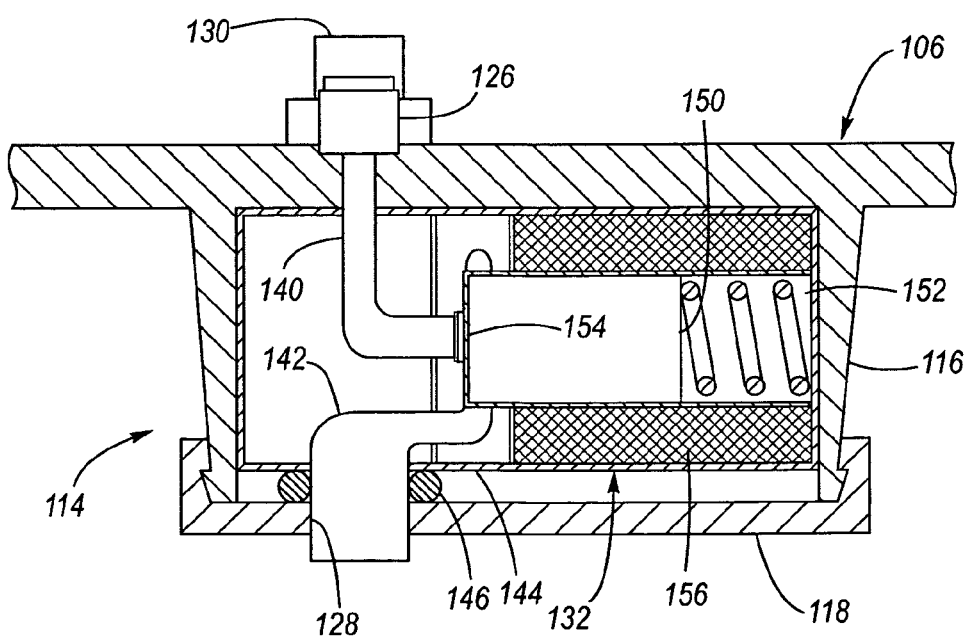
FIG. 4 is a detail sectional view, seen along line 4-4 of FIG. 3.

Referring now to FIGS. 2 through 4, a first preferred embodiment of the integrated solenoid valve and leveling device 100a is depicted. The leveling device is an air spring 104 having a housing 106 which includes a piston 106p and a cap 106c. Flexibly interconnecting the piston 106p and the cap 106c is a bellows 108. The bellows 108 is releasably connected at each of its ends to the housing 106, wherein a first annular clamp 110a sealingly clamps a first end 108a of the bellows to an annular land 112 of the cap 106c, and wherein a second annular clamp 110b sealingly clamps a second end 108b of the bellows to an annular land 115 of the piston 106p. The air spring 104 is located in a motor vehicle suspension system, as for example the system 10, wherein, for example, an axle floats relative to the frame based upon the cap 106c and the piston 106p being mutually separated by air pressure within the bellows.

Integrated with the housing 106 is a solenoid valve receptacle 114. The solenoid valve receptacle 114 is composed of a solenoid valve chamber 116 which may be, for example, cylindrical, elliptical, or rectangular in shape, and a complementarily shaped chamber cover 118, wherein the chamber cover is attached to the solenoid valve chamber so as to be selectively removable therefrom.

As shown at FIG. 2, the solenoid valve chamber 116 is integrally formed of the cap 106c portion of the air spring housing 106. In this regard, the solenoid valve chamber has a sidewall 124 which depends from the cap head 138 of the cap 106c interiorly with respect to the air spring 104, and terminates at a sidewall orifice 124a. The chamber cover 118 removably attaches to the solenoid valve chamber 116 at the sidewall orifice 124a. An example of a removable attachment modality (shown at FIG. 3) is via the chamber cover having a peripheral lip 118a having an internally disposed notch 120 which snappingly interfaces with a peripheral barb 122 of the sidewall 124; or another removable attachment modality may be used, as for example by threading or by threaded fasteners.

An air line fitting 126 is externally disposed in the cap 106c such that the air line fitting communicates with the solenoid valve chamber 116. The chamber cover 118 includes an air passage opening 128 which communicates with the solenoid valve chamber 116 when the chamber cover is attached to the sidewall 124 of the solenoid valve chamber. An electrical connector 130 is disposed externally with respect to the cap 106c adjacent the solenoid valve chamber 116, wherein an electrical connection can be made therefrom into the solenoid valve chamber.

A solenoid valve 132 is disposed in the solenoid valve receptacle 114, as may be more particularly understood by additional reference to FIGS. 3 and 4, which shows a nonlimiting exemplification thereof.

A first air passage 140 of the solenoid valve 132 is sealingly interfaced with the air line fitting 126, as for example by a press-fit. Electrical leads 136 extend between the electrical connector 130 and the solenoid valve 132 and provide an electrical connection therebetween.

A second air passage 142 of the solenoid valve 132 passes through the air passage opening 128 of the chamber cover 118. The shell 144 of the solenoid valve 132 and the second air passage 142 are sealed with respect to the chamber cover 118 at the second air passage 142 via an elastomeric O-ring 146.

As can be discerned from FIGS. 3 and 4, the solenoid valve has a generally conventional construction, wherein an armature 150 biased by a return spring 152 is selectively retracted from an air metering valve seat 154 via a solenoid 156.

In assembly of the integrated solenoid valve and leveling device 100, the air spring 104 is opened by the bellows 108 being unclamped at the annular 112 of the cap 106c. The chamber cover 118 is snapped off from the sidewall 124 of the solenoid valve chamber. A solenoid valve 132 is placed into the solenoid valve chamber, wherein the first air passage 140 is interfaced with the air line fitting 126. Electrical connection of an electrical lead 166 (see FIG. 3) is made to the electrical connector 130 and, thereby, to the solenoid valve 132. An air line 168 (see FIG. 3) is connected to the air fitting 126. The chamber cover is snapped back onto the sidewall of the solenoid valve chamber, wherein the second air passage 142 projects, in sealing relation via the O-ring 146 to the solenoid valve chamber, through the air passage opening 128 of the chamber cover. The bellows is again clamped to the annular land of the cap. An electrical plug of an air suspension system (as for example the system 10) is interfaced with the electrical connector. An air line is connected to the air line fitting.

In operation of the integrated solenoid valve and leveling device 100, in response to electrical signals from the air suspension system, the solenoid valve regulates the air pressure within the air spring and the motor vehicle is provided with an air suspension via flexing of the bellows. Should an untoward event occur to the air line, such as for example a cut or break wherein pressure is lost, the air valve will nonetheless independently maintain pressure within the air spring.

Figure 5:
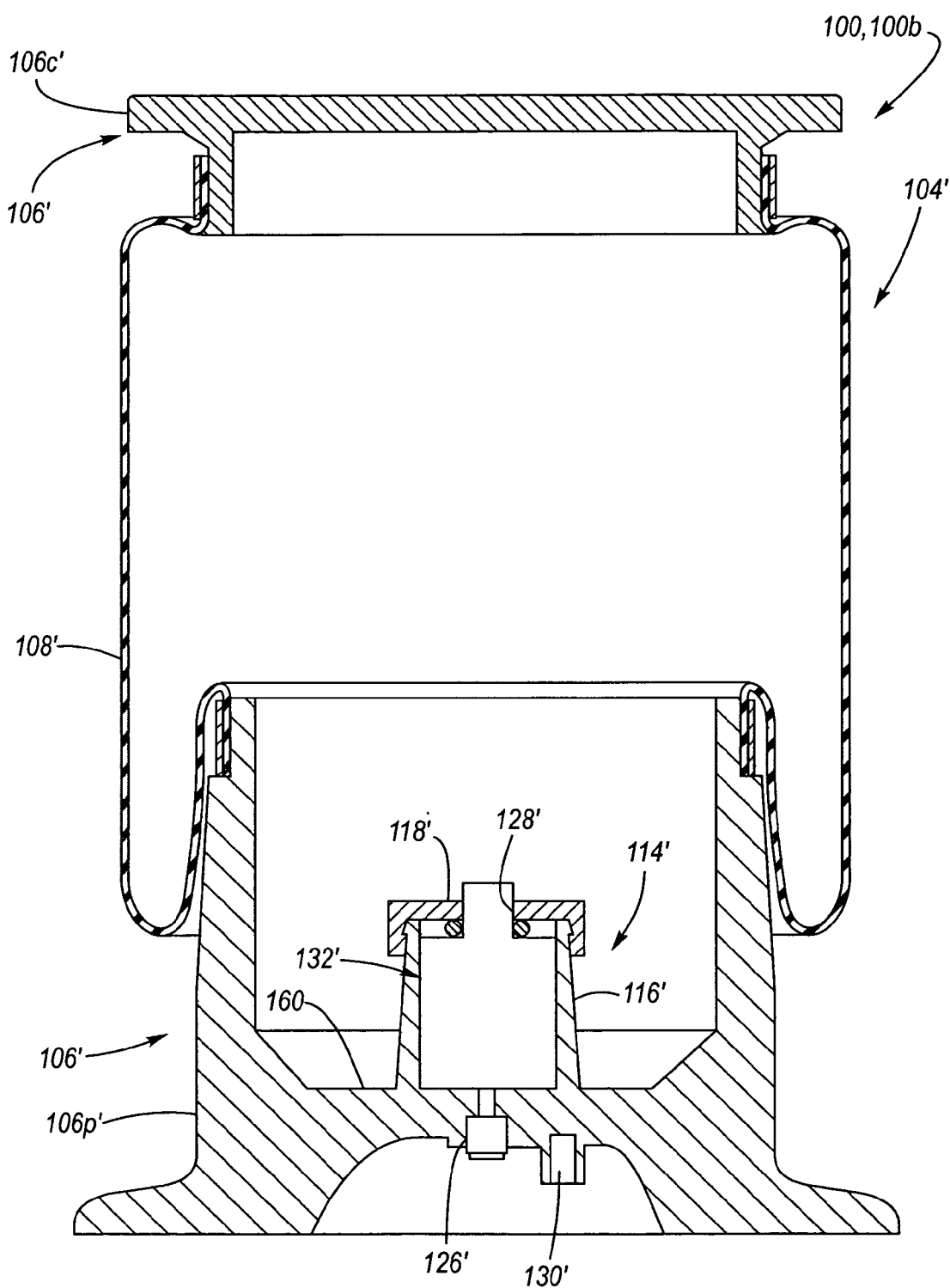
FIG. 5 is a sectional view of an air spring with integrated solenoid valve according to a second embodiment of the present invention.

Referring now to FIG. 5, a second embodiment of the integrated solenoid valve and leveling device 100b is depicted. Now the air spring 104' includes a solenoid valve receptacle 114' which is integrally formed with the piston floor 160 of the piston 106p' of an air spring 104'. The construction of the solenoid valve receptacle 114' is as described hereinabove with respect to FIGS. 2 through 4, so that further description is obviated, wherein like parts have like numeral designations with primes. A solenoid valve 132' is disposed within the solenoid valve chamber and interfaces as hereinabove described with respect to each of the air line fitting 126', the electrical connector 130' and the air passage opening 128'. Operation is as described hereinabove.

Figure 6:
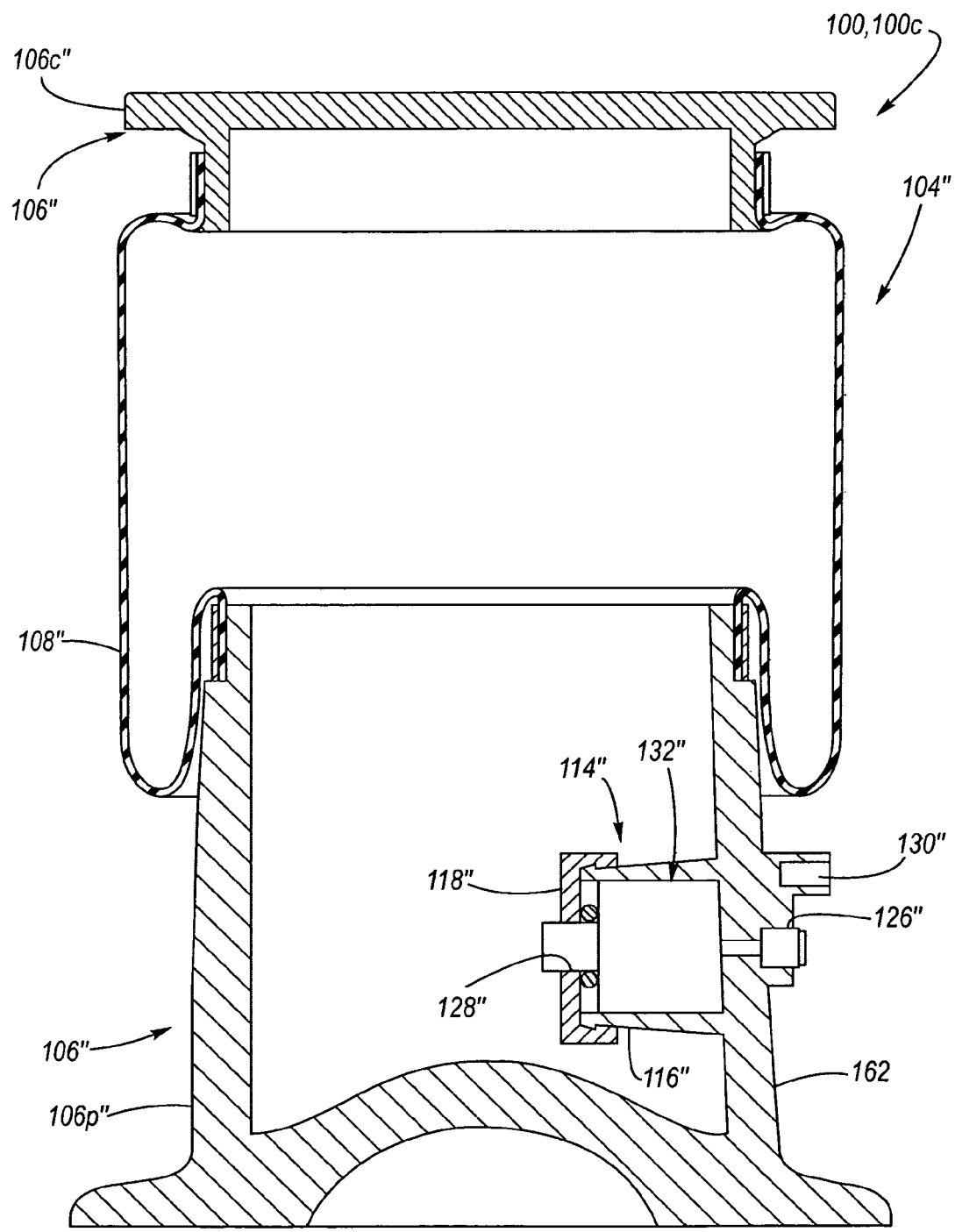
FIG. 6 is a sectional view of an air spring with integrated solenoid valve according to a third embodiment of the present invention.

Referring now to FIG. 6, a third embodiment of the integrated solenoid valve and leveling device 100c is depicted. Now the air spring 104" includes a solenoid valve receptacle 114" which is integrally formed with the piston wall 162 of the piston 106p" of an air spring 104". The construction of the solenoid valve receptacle 114" is as described hereinabove with respect to FIGS. 2 through 4, so that further description is obviated, wherein like parts have like numeral designations with double primes. A solenoid valve 132" is disposed within the solenoid valve chamber and interfaces as hereinabove described with respect to each of the air line fitting 126", the electrical connector 130" and the air passage opening 128". Operation is as described hereinabove.

Figure 7:
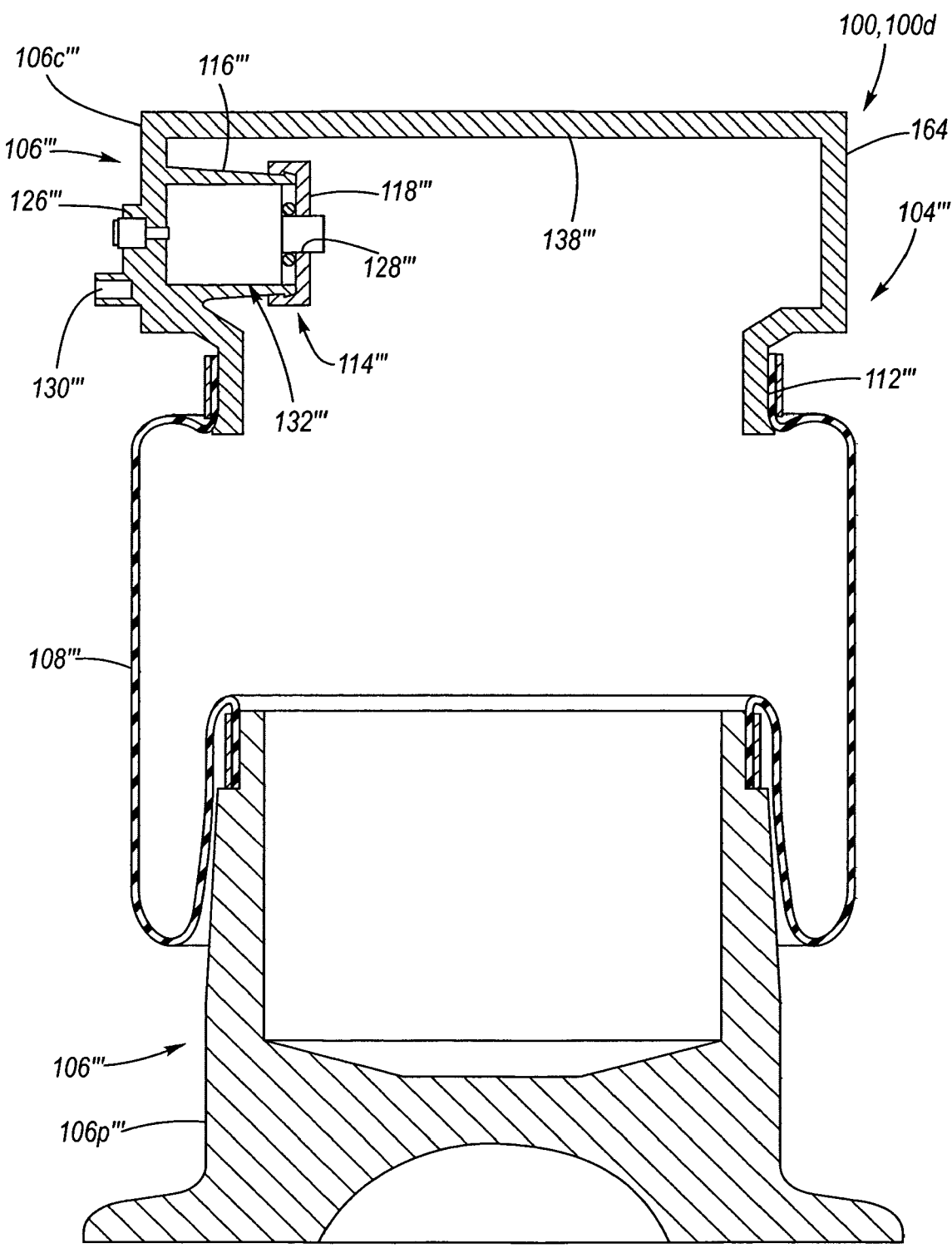
FIG. 7 is a sectional view of an air spring with integrated solenoid valve according to a fourth embodiment of the present invention.

Referring now to FIG. 7, a fourth embodiment of the integrated solenoid valve and leveling device 100d is depicted. The air spring 104''' has a cap 106c''' which includes a cap wall 164 extending between the head 138''' and the annular land 112'''. Now the solenoid valve receptacle 114''' is integrally formed with the cap wall 164 of the cap 106c''' of an air spring 104'''. The construction of the solenoid valve receptacle 114' is as described hereinabove with respect to FIGS. 2 through 4, so that further description is obviated, wherein like parts have like numeral designations with triple primes. A solenoid valve 132''' is disposed within the solenoid valve chamber and interfaces as hereinabove described with respect to each of the air line fitting 126''', the electrical connector 130''' and the air passage opening 128'''. Operation is as described hereinabove.

To those skilled in the art to which this invention appertains, the above described preferred embodiment may be subject to change or modification. For example, as mentioned hereinabove, a solenoid valve housed within a solenoid receptacle may be adapted according to the teachings hereinabove to any air operated leveling devices, including an air spring, air spring over damper (shock absorber) module, air spring over strut module, jounce bumper, etc. Such change or modification can be carried out without departing from the scope of the invention, which is intended to be limited only by the scope of the appended claims.

The invention claimed is:

1. An air operated leveling device for a motor vehicle suspension system, comprising:
    a housing having an interior disposition and an exterior disposition;
    a solenoid valve receptacle comprising:
        a solenoid valve chamber connected to said housing at said interior disposition thereof; and
        a chamber cover removably connected to said solenoid valve chamber, wherein said chamber cover has an air passage opening;
    an air fitting connected to said housing;
    a solenoid valve disposed within said solenoid valve receptacle, said solenoid valve having a first air passage and a second air passage, wherein said first air passage communicates with said air fitting and said second air passage communicates with said interior disposition of said housing through said air passage opening of said chamber cover; and
    an electrical connector connected to said housing and electrically connected to said solenoid valve;
    wherein said air passage opening of said chamber cover of said solenoid valve receptacle is always sealed with respect to said second air passage of said solenoid valve; and
    wherein said seal maintains air pressure at said interior disposition of said housing independently of a pressure loss at said air fitting.

2. The leveling device of claim 1, wherein said leveling device is an air spring; wherein said housing comprises a cap and a piston which are mutually interconnected flexibly by a bellows; and wherein said solenoid valve receptacle is integrally connected to said housing.

3. The leveling device of claim 2, wherein said cap comprises a cap head; wherein said solenoid valve receptacle is integrally connected to said cap head at said interior disposition of said housing.

4. The leveling device of claim 2, wherein said cap comprises a cap head and a cap wall connected to said cap head; wherein said solenoid valve receptacle is integrally connected to said cap wall at said interior disposition of said housing.

5. The leveling device of claim 2, wherein said piston comprises a piston floor; wherein said solenoid valve receptacle is integrally connected to said piston floor at said interior disposition of said housing.

6. The leveling device of claim 2, wherein said piston comprises a piston floor and a piston wall connected to said piston floor; wherein said solenoid valve receptacle is integrally connected to said piston wall at said interior disposition of said housing.

7. An air suspension system of a motor vehicle comprising:
    a computer;
    an air spring and solenoid valve combination, comprising:
        a housing, said housing comprising:
            a cap; and
            a piston;
        a bellows flexibly interconnecting said cap with said piston, wherein said housing and said bellows mutually define interior and exterior dispositions of said housing;
        a solenoid valve receptacle comprising:
            a solenoid valve chamber integrally connected to said housing at said interior disposition thereof; and
            a chamber cover removably connected to said solenoid valve chamber, wherein said chamber cover has an air passage opening;
    an air line;
    a source of pressurized air which selectively pressurizes said air line;
    an air fitting connected to said housing, said air fitting connecting to said air line;
    a solenoid valve disposed within said solenoid valve receptacle, said solenoid valve having a first air passage and a second air passage, wherein said first air passage communicates with said air fitting and said second air passage communicates with said interior disposition of said housing through said air passage opening of said chamber cover;
    an electrical connector connected to said housing and electrically connected to said solenoid valve; and
    a signal line between said computer and said electrical connector;
    wherein said air passage opening of said chamber cover of said solenoid valve receptacle is always sealed with respect to said second air passage of said solenoid valve; and
    wherein said seal maintains air pressure at the interior of said housing independently of a pressure loss in said air line.

8. The combination of claim 7, wherein said solenoid valve receptacle is integrally connected with said cap.

9. The combination of claim 7, wherein said solenoid valve receptacle is integrally connected with said piston.

* * * * *